United States Patent
Freer et al.

(10) Patent No.: US 7,357,456 B1
(45) Date of Patent: Apr. 15, 2008

(54) MOTORCYCLE PASSENGER SEAT ADJUSTABLE ARM REST

(76) Inventors: William Freer, 6220 Buffalo Hills Dr. NE., Albuquerque, NM (US) 87111; Mary Martin, 6220 Buffalo Hills Dr. NE., Albuquerque, NM (US) 87111

( * ) Notice: Subject to any disclaimer, the term of this patent is extended or adjusted under 35 U.S.C. 154(b) by 0 days.

(21) Appl. No.: 11/214,074

(22) Filed: Aug. 29, 2005

Related U.S. Application Data

(60) Provisional application No. 60/606,651, filed on Sep. 2, 2004.

(51) Int. Cl.
*A47C 7/54* (2006.01)

(52) U.S. Cl. .............. 297/411.38; 297/411.25; 297/411.29

(58) Field of Classification Search ............ 297/411.2, 297/411.25, 411.29, 411.32, 411.38, 411.36, 297/411.4; 280/304.4, 290, 219
See application file for complete search history.

(56) References Cited

U.S. PATENT DOCUMENTS

| | | | |
|---|---|---|---|
| 585,913 A * | 7/1897 | Haynes | 297/411.32 |
| 3,901,534 A * | 8/1975 | Popken | 280/304.4 |
| 4,225,183 A | 9/1980 | Hanagan | |
| 4,549,629 A * | 10/1985 | Komuro | 180/219 |
| 4,695,096 A | 9/1987 | Kincaid | |
| 5,547,253 A * | 8/1996 | Schwartz et al. | 297/338 |
| 5,768,919 A | 6/1998 | Karlsson | |
| 6,164,725 A | 12/2000 | Santa Cruz | |
| 6,976,552 B1 * | 12/2005 | Kicker | 180/219 |

* cited by examiner

*Primary Examiner*—Laurie K. Cranmer
(74) *Attorney, Agent, or Firm*—Howard Cohen

(57) ABSTRACT

An arm rest assembly for a motorcycle passenger seat includes a vertically adjustable mount secured to the typical backrest behind the passenger seat. A U-shaped tubular member includes a medial portion rotatably secured in the mount, and arm rest cushions secured to opposed side arm portions. The U-shaped member is rotatable through an arc of approximately 180° about the axis of the medial portion, the range being limited by stop members joined to the medial portion. The side arm portions extend rearwardly to support baggage, or rotated to an upwardly extending disposition in which the passenger may mount or dismount the passenger seat, to a forwardly extending disposition in which the side arm portions extend to support the arms of the passenger and to provide side support for the passenger.

13 Claims, 8 Drawing Sheets

MOTORCYCLE PASSENGER SEAT ADJUSTABLE ARM REST

CROSS-REFERENCE TO RELATED APPLICATIONS

This application claims the benefit of the filing date of related Provisional Application No. 60/606,651, filed Sep. 2, 2004.

FEDERALLY SPONSORED RESEARCH

Not applicable.

SEQUENCE LISTING, ETC ON CD

Not applicable.

BACKGROUND OF THE INVENTION

1. Field of the Invention

This invention relates to a motorcycle arm rest and, more particularly, to an arm rest for a passenger seat that fully adjusts for passenger comfort and multiple uses.

2. Description of Related Art

U.S. Pat. No. 4,695,096 describes a motorcycle arm rest for a passenger seat in which the arm rest is supported on a vehicle frame rail, and the arm rest pivots laterally to enable the passenger to mount and dismount the passenger seat. This single arm rest provides support for one arm, but it provides no security in side-to-side acceleration, and provides no other function.

U.S. Pat. No. 6,164,725 describes a tandem arm rest for a motorcycle passenger seat. It includes a U-shaped arm rest coupled to an upright attachment plate, with the plate being insertable between the passenger back cushion and the backrest bar that supports it. This construction is removable, but it is not adjustable to any meaningful extent. In addition, the assembly cannot serve any other purpose.

U.S. Pat. No. 4,225,183 discloses a tandem arm rest for a motorcycle passenger seat in which each arm rest is independently supported on the backrest and unconnected to the other arm rest. Each arm rest is mounted on a bracket that enables rotation of the arm rest about a vertical axis, or a horizontal axis for quick dismount of the passenger from the seat.

It is apparent that the prior art does not make available an arm rest for a motorcycle passenger seat that provides security during lateral acceleration, easy mount and dismount from the seat, and adaptability to other purposes.

BRIEF SUMMARY OF THE INVENTION

The invention generally comprises an arm rest assembly for a motorcycle passenger seat. The assembly is designed to be secured to the typical backrest provided for a motorcycle passenger. The assembly includes a U-shaped tubular member having arm rest cushions secured to opposed side arm portions, and a mounting assembly for joining the U-shaped member to a typical backrest in a manner that is vertically adjustable, and that permits the U-shaped member to be rotated about an axis that extends through the medial portion of the U configuration. The U-shaped member is rotatable through an arc of approximately 180°, from a position in which the side arm portions extend rearwardly and are positioned to support baggage and the like, to an upwardly extending disposition in which the passenger may mount or dismount the passenger seat, to a forwardly extending disposition in which the side arm portions extend to support the arms of the passenger and to provide side support for the passenger that counteracts side-to-side motion resulting from acceleration during turns and in strong winds.

DETAILED DESCRIPTION OF THE INVENTION

Figure 1:
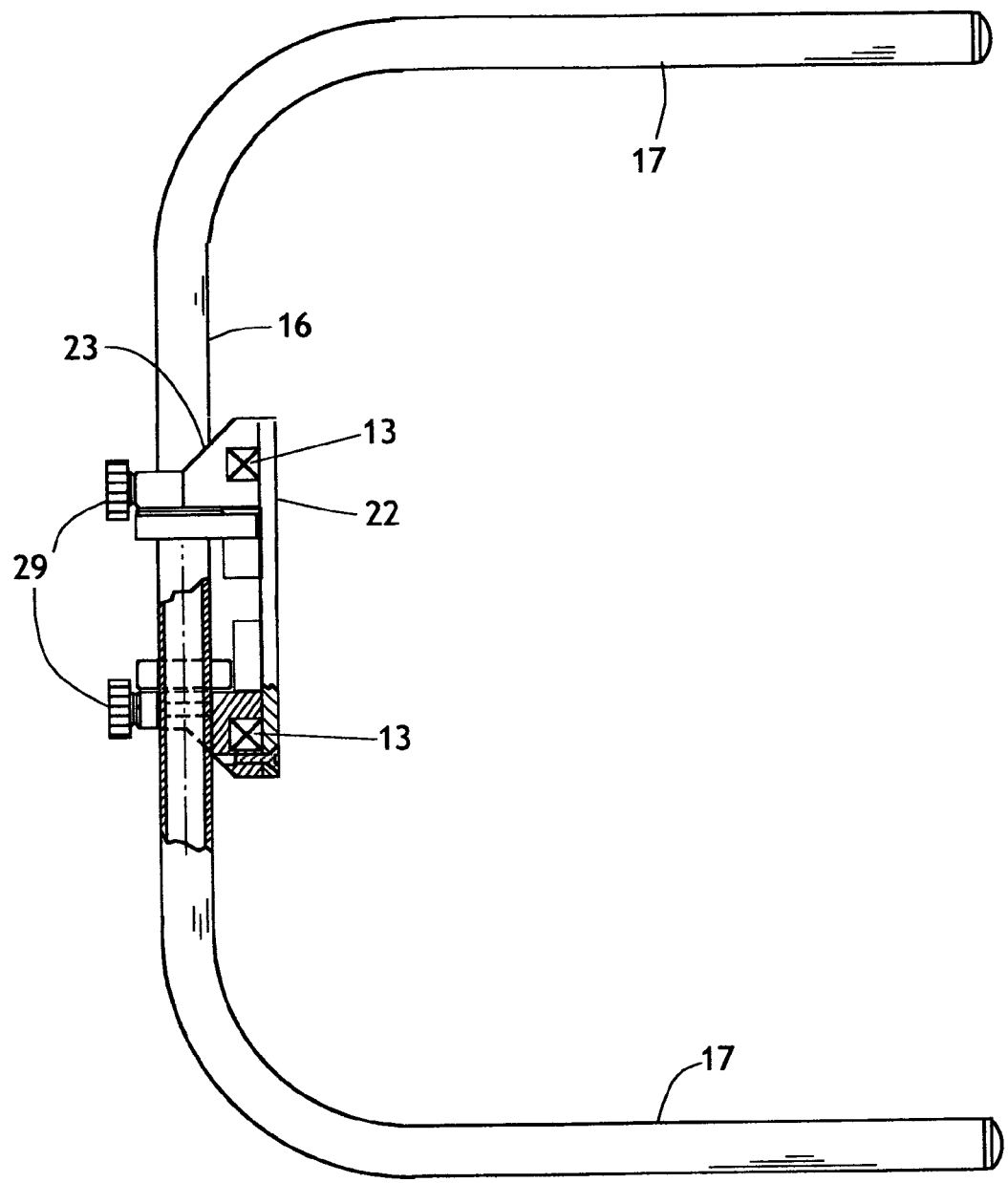
FIG. 1 is a partially cross-sectioned plan view of the arm rest and mounting assembly of the present invention.

The present invention generally comprises an arm rest assembly for a motorcycle passenger seat. With regard to the accompanying Figures, the assembly is designed to be secured to the typical backrest 11 provided behind the passenger seat 12 of a motorcycle. A backrest support generally includes a U-shaped tube or bar 13 extending from frame components of the motorcycle and having an upper end 14. A back rest 15 pad is typically secured to the backrest 11 directly above the seat 12.

With regard to FIG. 1, the arm rest of the invention includes a U-shaped tubular member having a medial portion 16 and two parallel end portions 17 extending generally perpendicularly from the medial portion. Arm rest cushions 18 are secured to opposed end portions 17 (see FIGS. 7-10), and a mounting assembly 21 (see FIG. 2) is provided for joining the U-shaped member to backrest support 13 in a manner that is vertically adjustable, and that permits the U-shaped member to be rotated about an axis that extends through the medial portion 16 of the U configuration.

Figure 2:
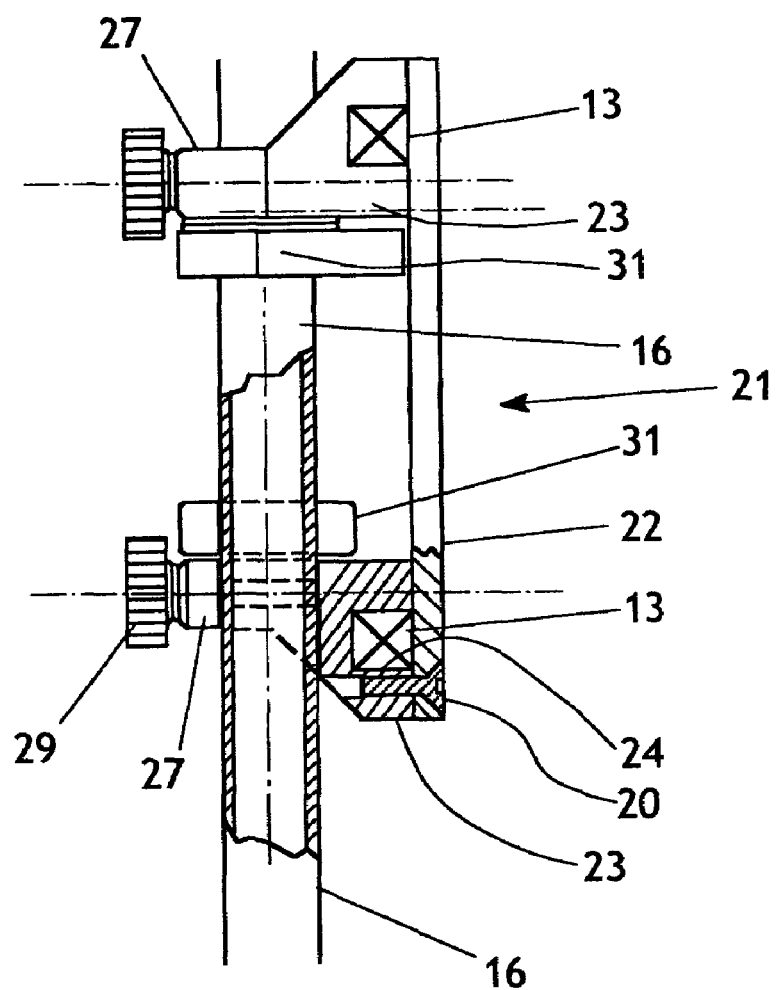
FIG. 2 is a magnified partially cross-sectioned plan view of the arm rest and mounting assembly of the present invention.
Figure 3:
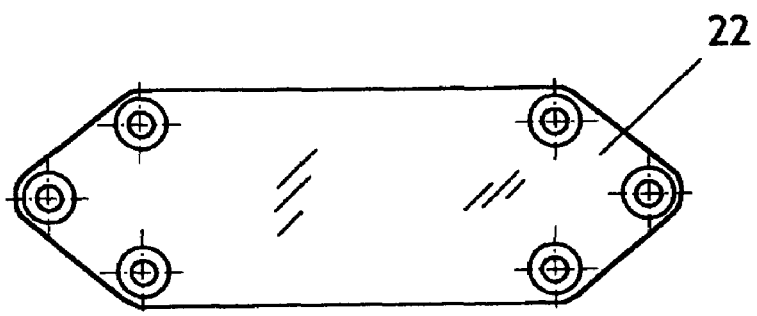
FIG. 3 is a plan view of the backing plate of the present invention.
Figure 4:
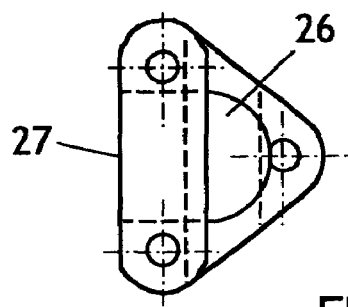
FIGS. 4-6 are orthogonal views of the mounting bracket component of the present invention.
Figure 5:
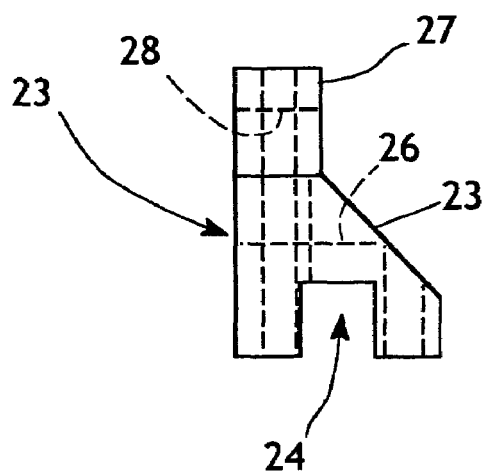
Figure 6:
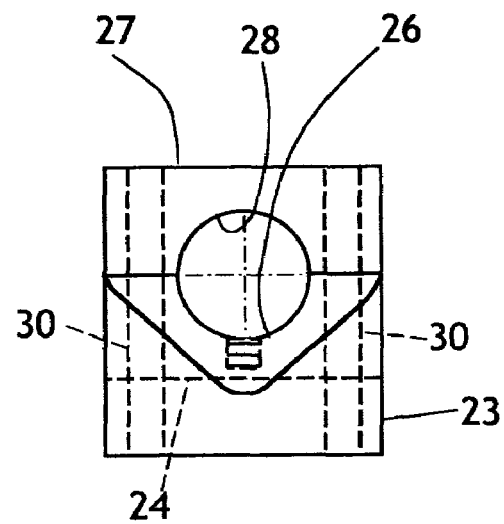
Figure 7:
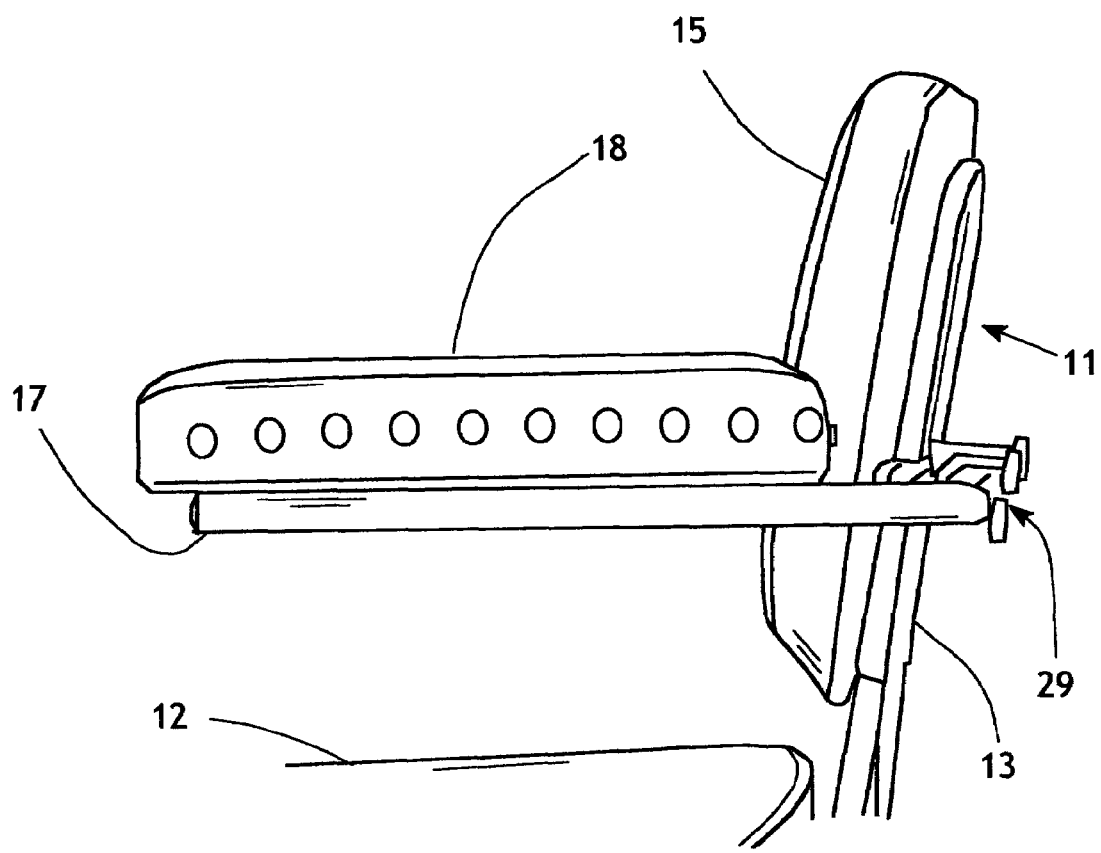
FIG. 7 is a side elevation of the arm rest depicted in a deployed disposition.

With regard to FIG. 2, the mounting assembly 21 includes a backing plate 22 that is adapted to extend laterally across the front surfaces of the support 13. A pair of mounting brackets 23 are secured to the backing plate 22 by screws or bolts 20. Each bracket 23 includes a channel-like cavity 24 dimensioned to receive a support 13 therein (FIGS. 4-6), and to clamp the support therein against the backing plate 22. Backrest support may be made of any shape stock including but not limited to square, round & flat. Each bracket also includes a semi-cylindrical channel-like recess 26 that mates with a clamping member 27 having a similar recess 28, the recesses 26 and 28 defining together a cylindrical passage through which the medial portion 16 of the arm rest extends.

Two thumb screws 29 extend through the clamping member 27 to tapped holes 30 in each bracket 23 to apply selectively variable clamping force to the medial portion 16, so that the arm rest tube is secured to the brackets 23 and thus to the backrest of the motorcycle. The thumb screws 29 are adjustable to control the amount of friction associated with rotation of the arm rest about the axis of the medial portion 16, and are removable to enable quick removal of the arm rest from the motorcycle. Note that the arm rest assembly may be rotated about the axis of the medial portion 16 thereof, and is prevented from any other rotational or translational movement.

Figure 11:
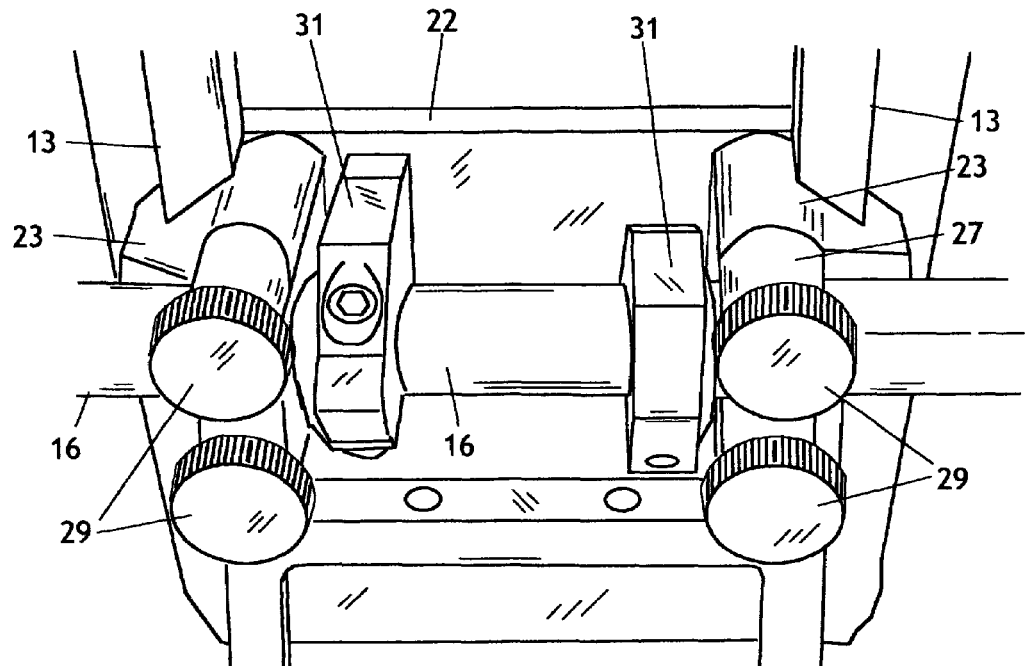
FIG. 11 is a rear elevation of the mounting assembly for joining the arm rest assembly to a motorcycle.
Figure 12:
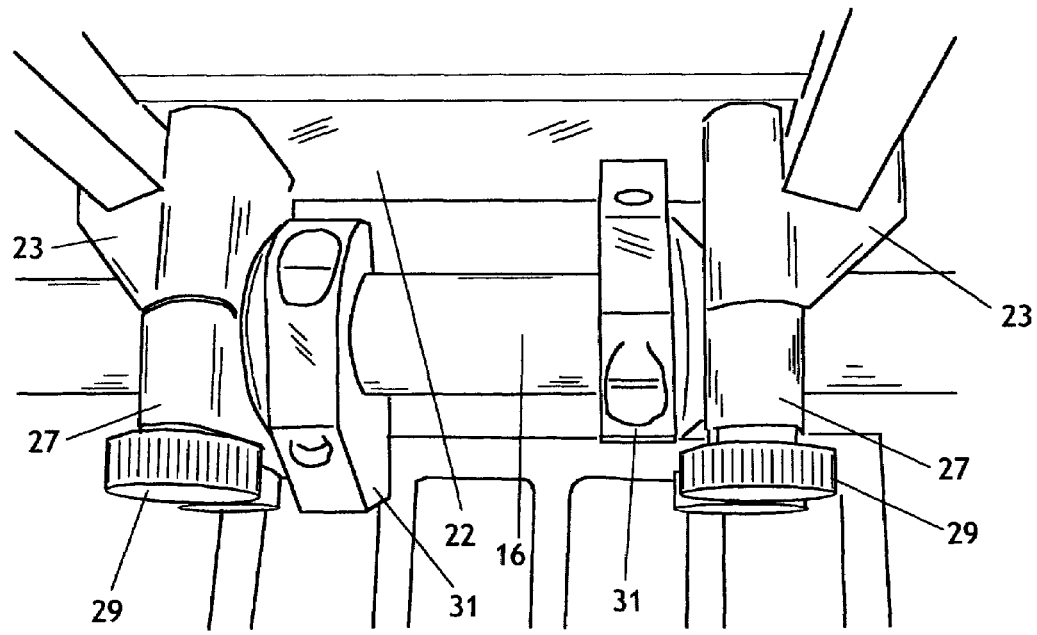
FIG. 12 is a top view of the mounting assembly for joining the arm rest assembly to a motorcycle.
Figure 13:
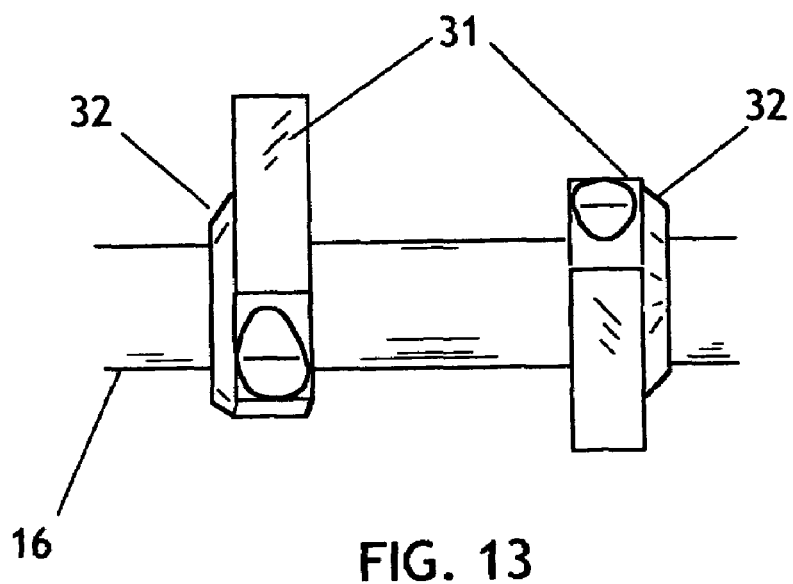
FIG. 13 is a top view of rotational stops secured on the arm rest tube.
Figure 14:
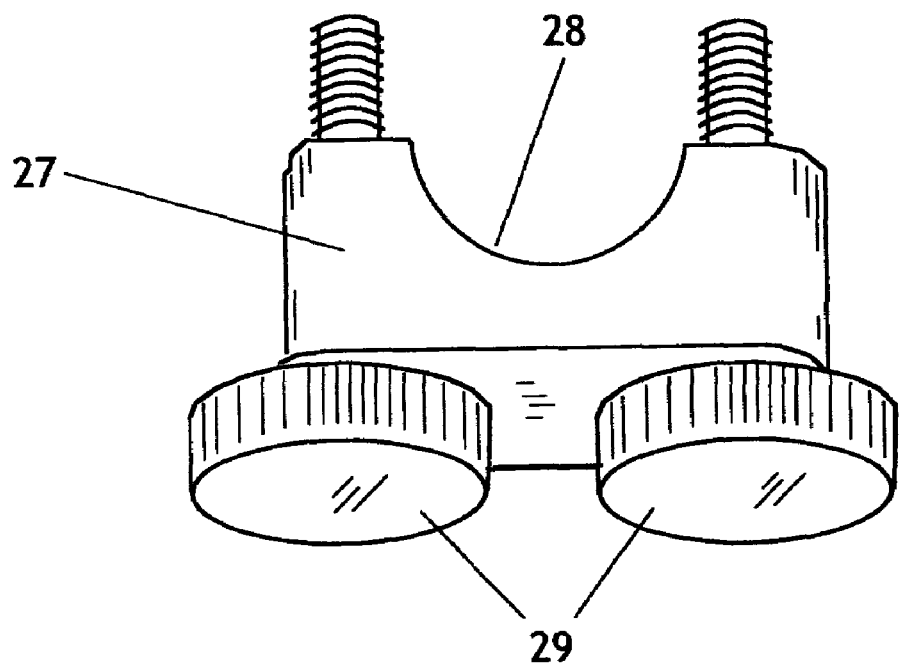
FIG. 14 is a perspective view of the thumbscrew clamp assembly of the invention.

The mounting assembly also includes a pair of cam-like stops 31 secured to the medial portion 16 proximate to the backing plate 22 (see FIGS. 11-13). The stops 31 may be clamped fixedly to the medial portion 16, but are preferably angularly adjustable about the axis of the medial portion 16 to provide maximum passenger comfort. Each stop 31 includes a lobe projecting radially outwardly and disposed to impinge on a portion of the backing plate when a rotational limit is reached. Note also that each stop 31 includes an integral bushing 32 that impinges on the respective adjacent bracket 23, thus preventing lateral translation of the member 16 in either axial direction. Thus when the arm rest is rotated forwardly as in FIG. 7, the arm rests cannot move in the lateral direction and thereby provide substantial lateral support to the passenger against lateral acceleration.

Figure 8:
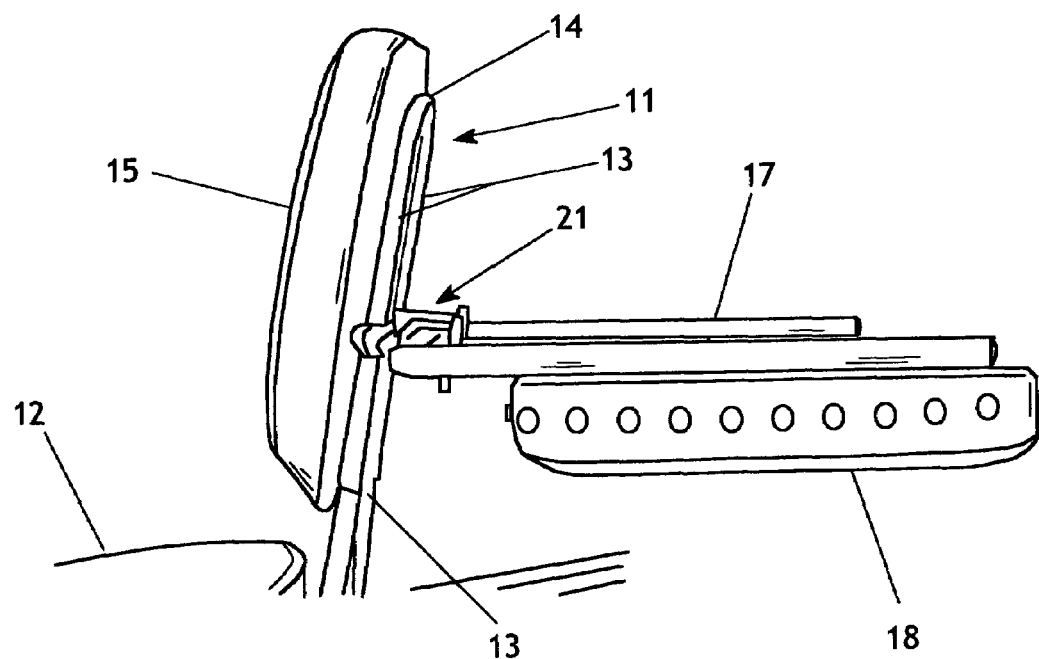
FIG. 8 is a side elevation of the arm rest depicted in a baggage supporting disposition.
Figure 9:
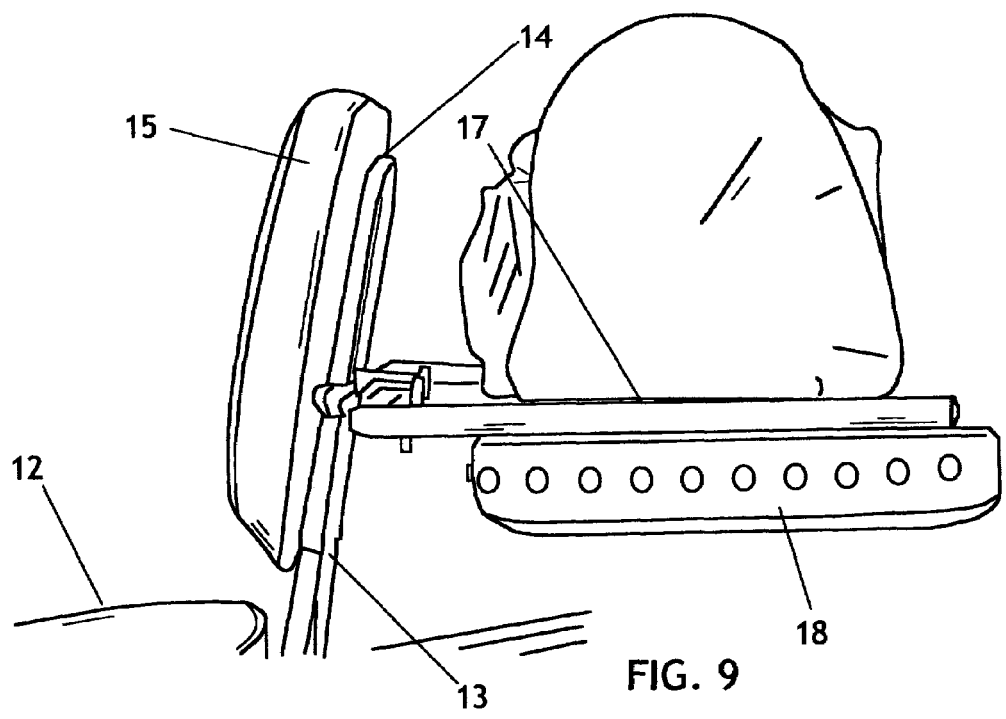
FIG. 9 is a side elevation of the arm rest depicted in a baggage supporting disposition, with baggage.
Figure 10:
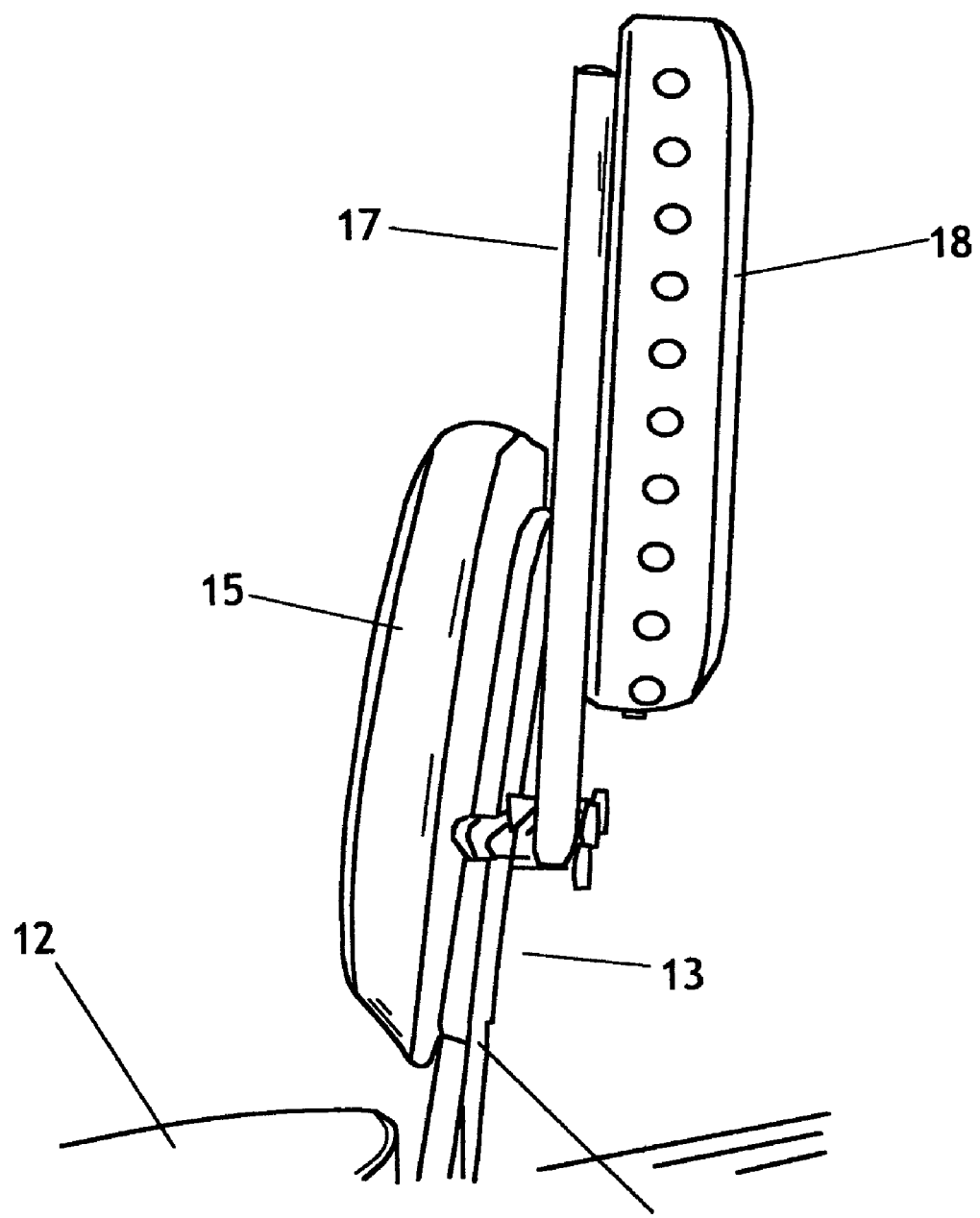
FIG. 10 is a side elevation of the arm rest disposed in an upright disposition for passenger mounting and dismounting the passenger seat.

The U-shaped member is rotatable through an arc of approximately 180°, the range extending from a first position in which the side arm portions 17 extend forwardly to support the arms of the passenger and to provide side support that counteracts side-to-side accelerations (FIG. 7); to an upwardly extending second position in which the passenger may mount or dismount the passenger seat (FIG. 10); to a third, rearwardly extending disposition in which the arm portions 17 are positioned to support baggage and the like (FIGS. 8, 9). The stops 31 are each configured to have a surface or prominence disposed to impinge on the backing plate 22 when the arm rest is rotated to either of the first or third positions. Each stop 31 may be formed as a two part assembly that is joined about the medial portion 16 in the fashion of a clamp. Thus the angular orientations of the stops 31 may be adjusted easily (loosened, angularly adjusted, re-tightened) to enable the arm rest 17, 18 to be rotated to the optimum stop angles for riding and luggage support, considering the angle of the backrest and the placement of other vehicle components, such as a luggage rack, fender, carrier, and the personal preference of the passenger.

The invention offers the passenger a positive grip on the armrest pads, eliminating the need for the passenger to find a hand-hold beneath the seat or on the driver. It also reduces side-to-side motion of the passenger in wind and in turns, and offers a greatly increased sense of passenger security. Additionally, the invention provides the added function of rotating rearwardly 180° to become a luggage support for a small suitcase or duffle bag.

Also, the invention offers continuously variable adjustability to accommodate passenger size and comfort: vertical adjustment up and down the backrest to adjust to passenger height; lateral adjustment to compensate for the angle of the backrest, so armrests are parallel to road and to seat; and differing model sizes to accommodate a range of passenger sizes.

The foregoing description of the preferred embodiments of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

The invention claimed is:

1. A motorcycle arm rest assembly for a motorcycle passenger seat having an upright backrest, including:
   a U-shaped member having a medial portion and two parallel end portions extending from opposed ends thereof, said two parallel end portions being configured as arm rests;
   mounting means for securing said U-shaped member to the upright backrest, said mounting means including means for rotating said U-shaped member about an axis through said medial portion of said U-shaped member, and stop means for limiting rotation of said U-shaped member in a forward direction to a first arm rest position;
   wherein said mounting means includes first clamping means for securing said assembly to the upright backrest, said first clamping means being vertically adjustable along the upright backrest.

2. The motorcycle arm rest assembly of claim 1, wherein said mounting means includes second clamping means for engaging said medial portion of said U-shaped member in rotatable fashion about said axis.

3. The motorcycle arm rest assembly of claim 2, wherein said stop means includes at least one stop member secured to said medial portion of said U-shaped member.

4. The motorcycle arm rest assembly of claim 3, wherein said mounting means includes a backing plate disposed to be impinged upon by said at least one stop member when said U-shaped member is rotated to said first arm rest position.

5. The motorcycle arm rest assembly of claim 4, further including a second stop member secured to said medial portion of said U-shaped member, said second stop member disposed to impinge on said backing plate when said U-shaped member is rotated to a second position in which said arm rests extend rearwardly in a cargo-supporting disposition.

6. The motorcycle arm rest assembly of claim 4, wherein said backing plate comprises a portion of said first clamping means.

7. A motorcycle arm rest assembly for a motorcycle passenger seat having an upright backrest, including:
   a U-shaped member having a medial portion and two parallel end portions extending from opposed ends thereof, said two parallel end portions being configured as arm rests;
   mounting means for securing said U-shaped member to the upright backrest, said mounting means including means for rotating said U-shaped member about an axis through said medial portion of said U-shaped member, and stop means for limiting rotation of said U-shaped member in a forward direction to a first arm rest position;
   wherein said mounting means includes at least one mounting bracket having a first channel extending therein to receive a structural member of the backrest, and a backing plate secured to said at least one mounting bracket to secure the structural member in said first channel.

8. The motorcycle arm rest assembly of claim 7, wherein said at least one mounting bracket includes a second channel extending therein to receive said medial portion of said U-shaped member, and a clamping member adjustably secured to said mounting bracket in a position to secure said medial portion of said U-shaped member in said second channel.

9. The motorcycle arm rest assembly of claim 8, further including a pair of mounting brackets, each secured to an individual structural member of the backrest, both mounting brackets being secured to the same backing plate.

10. The motorcycle arm rest assembly of claim 8, wherein said stop means includes at least one stop member secured to said medial portion of said U-shaped member disposed to impinge on said backing plate when said U-shaped member is rotated to said first arm rest position.

11. The motorcycle arm rest assembly of claim 10, wherein said stop means includes a second stop member secured to said medial portion of said U-shaped member, said second stop member disposed to impinge on said backing plate when said U-shaped member is rotated to a second position in which said arm rests extend rearwardly from the upright backrest.

12. The motorcycle arm rest assembly of claim 11, further including means for adjusting the angular disposition of said stop members about said medial portion of said U-shaped member.

13. The motorcycle arm rest assembly of claim 7, wherein said at least one mounting bracket is secured in vertically adjustable fashion along the upright backrest.

* * * * *